United States Patent
Zimmer

[19]

[11] Patent Number: 6,109,682
[45] Date of Patent: Aug. 29, 2000

[54] MOTOR VEHICLE DOOR OR HATCH

[75] Inventor: Erich Zimmer, Wadern, Germany

[73] Assignee: Thyssen Krupp Industrie AG, Essen, Germany

[21] Appl. No.: 09/051,400

[22] PCT Filed: Oct. 4, 1996

[86] PCT No.: PCT/EP96/04319

§ 371 Date: Apr. 6, 1998

§ 102(e) Date: Apr. 6, 1998

[87] PCT Pub. No.: WO97/14569

PCT Pub. Date: Apr. 24, 1997

[30] Foreign Application Priority Data

Oct. 17, 1995 [DE] Germany ............... 195 38 595

[51] Int. Cl.[7] ........................... B60J 10/08
[52] U.S. Cl. ............... 296/146.9; 296/146.5; 29/897.2; 219/121.63
[58] Field of Search ............ 296/146.5, 146.6, 296/146.9; 49/502; 29/897.2; 228/212, 44.3; 219/121.63, 121.64

[56] References Cited

U.S. PATENT DOCUMENTS

| | | |
|---|---|---|
| 2,211,257 | 8/1940 | Deisley et al. . |
| 2,756,312 | 7/1956 | Watter . |
| 4,196,840 | 4/1980 | McClure ................. 228/212 |
| 4,306,380 | 12/1981 | Vettel ................. 296/146 X |
| 4,413,854 | 11/1983 | Hirshberg . |
| 4,427,869 | 1/1984 | Kimura et al. . |
| 4,880,267 | 11/1989 | Ohya . |
| 4,888,919 | 12/1989 | Strosberg et al. ............ 49/502 |
| 5,115,115 | 5/1992 | Alborante . |
| 5,147,105 | 9/1992 | Ono et al. ................. 296/146 |
| 5,591,358 | 1/1997 | Quagline ............. 219/121.63 |
| 5,941,590 | 8/1999 | Reynolds et al. ........... 296/39.1 |

FOREIGN PATENT DOCUMENTS

| | | |
|---|---|---|
| 0 305 920 A2 | 3/1989 | European Pat. Off. . |
| 38 15 068 | 11/1989 | Germany . |
| 43 07 563 | 9/1993 | Germany . |
| 42 40 824 | 1/1994 | Germany . |
| 42 40 822 | 4/1994 | Germany . |
| 57-199590 | 12/1982 | Japan . |
| 2-6279 | 1/1990 | Japan . |
| 5-270440 | 10/1993 | Japan . |
| 2 246 091 | 1/1992 | United Kingdom . |

*Primary Examiner*—D. Glenn Dayoan
*Assistant Examiner*—Patricia Engle
*Attorney, Agent, or Firm*—McGlew and Tuttle, P.C.

[57] ABSTRACT

A motor vehicle door or hatch with an outer sheet and an inner sheet which are mutually supported and secured together at the edge region. An edge strip of the inner sheet is bent down towards the inside of the door to form a bead and secured to an edge strip of the outer sheet also bent downwards towards the inside of the door. A laser weld seam fills the gap between the two edge strips.

20 Claims, 8 Drawing Sheets

MOTOR VEHICLE DOOR OR HATCH

FIELD OF THE INVENTION

The invention relates to a motor vehicle door or hatch with an outer sheet and an inner sheet which are mutually supported and secured together at an edge region.

BACKGROUND OF THE INVENTION

Motor vehicle doors or hatches are expected to not only possess sufficient strength but the interior space created between outer sheet and inner sheet is also expected to be sealed against moisture. The approach pursued to this effect in practice is that the outer sheet is bent around the inner sheet, using one bordering tool or more so that the edge of the inner sheet is bordered by the outer sheet. An adhesive is brought into the bordering to achieve sufficient strength. A sealing adhesive is applied over the seam in the area of the free edge of the outer sheet in order to seal the bordering against moisture. Both adhesives have to be warmed-up at the restrained edge of the motor vehicle door or hatch to achieve sufficient strength and tightness.

It is known practice to connect edges of overlapping sheet metal plates by way of laser welding. One application of this method a laser beam is pointed into the gap created between these two sheets in such a manner that this laser beam is reflected several times and that the material of both sheets smelts in the area of the gap (vide EP 0511 746). If required, an additional material may also be brought into the gap (vide DE 434 1255).

SUMMARY AND OBJECTS OF THE INVENTION

It is a primary object of this invention to specify a motor vehicle door or hatch of the species described herein above which is simple to produce while possessing sufficient strength and sealing qualities.

This object is solved in that an edge strip of the inner sheet is angularly spaced, and connected to, a main portion of the inner sheet by a bend. This type of bent connection between a main portion and an edge strip will furthermore be described as "bent off". This bent off connection is in a direction of an inside of the door to form a bead. That bead is connected with an edge strip of the outer sheet which is also bent off in the direction of the inside of the door. A laser weld seam fills the gap between the two edge strips to establish the connection of the two edge strips.

The edge strips which may be bent at an angle of <90° or equal to 90° or even >90° versus the plane of the outer sheet and/or plane of the door will enhance the moment of resistance substantially. A bead thus formed can be utilized for a sealing. The linkage between the two edge strips by way of a laser weld seam meets all requirements for sufficient strength and sealing so that special measures for sealing, particularly an application of sealing adhesives, can be omitted. A laser weld connection also allows for the use of sheet metal plates in minium thickness so that savings on material can be achieved.

In one embodiment of this invention, the edge strip of the inner sheet has a holding bead for a sealing, with the bead extending out from the area of connection. To this effect a holding strip may be bent from the plane of the connection area backward and into a direction substantially orthogonal to the door plane.

In another embodiment of this invention, the edge strip of the inner plate is of a U-channel type shape, forming a hollow profile together with an allocated section of the outer sheet to serve as holding bead for sealing. It is recommend in this embodiment for the edge strips of the outer and inner sheet to be connected to each other.

The connection of the edge regions of the outer sheet and inner sheet of a motor vehicle door or hatch includes bending one edge strip each from the outer sheet and inner sheet. The sheets are laid on each other and are restrained in a supporting range or area between a support and a hold-down device. The edge strip of the outer sheet has a clamping slide pressed against the edge strip of the inner sheet, and the edge strips are welded together by way of a laser beam pointed into the gap between both edge strips.

Advantages of this invention are that the connection between outer sheet and inner sheet established by laser welding lead to greater strength and to improved function while maintaining the same weight. If required, the thickness of the sheet metal plate can be reduced to save on material cost. The motor vehicle door or hatch of this invention can have a holding bead with a sealing that can be installed in an exact fit and with a safe function.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
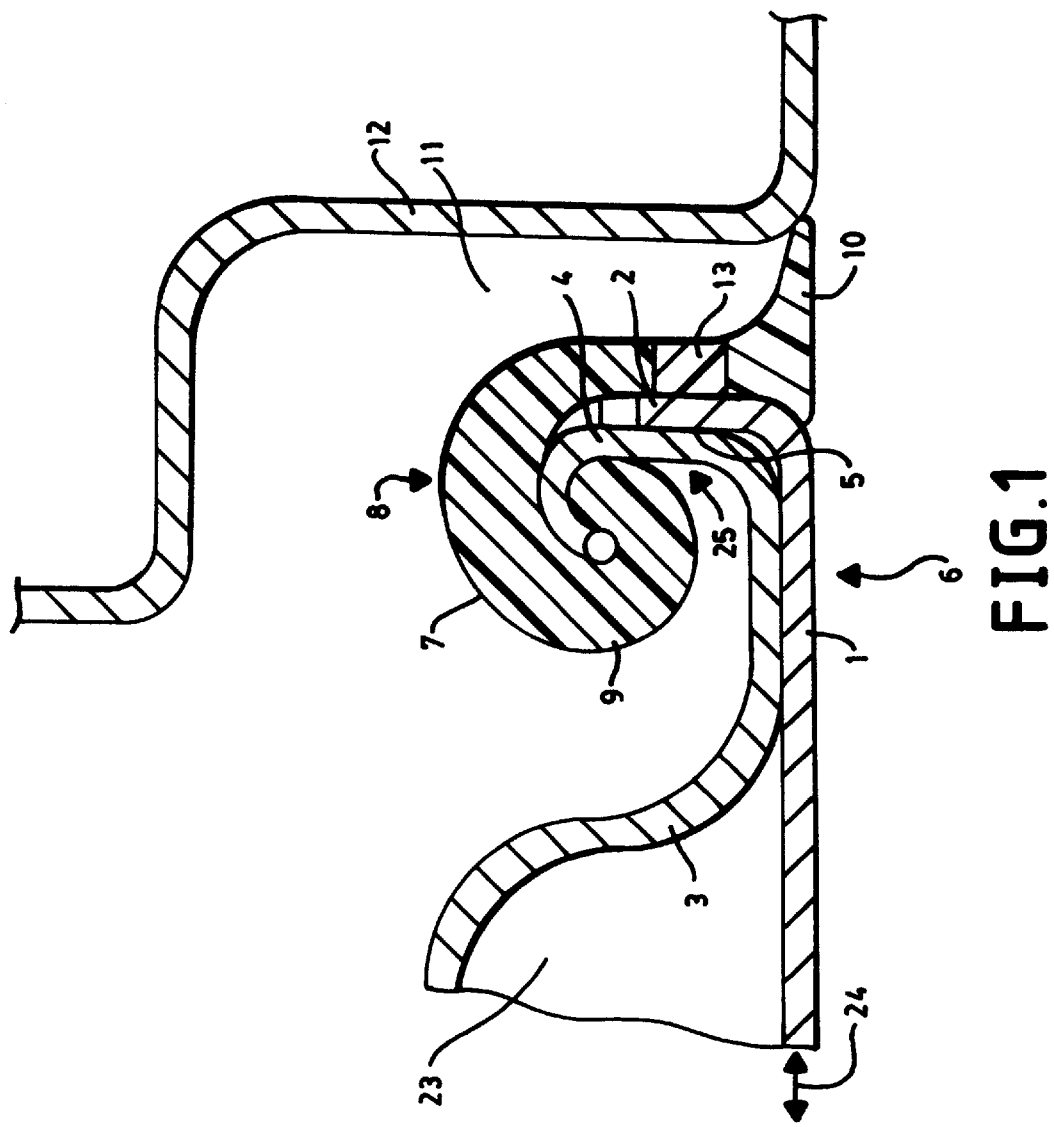
FIG. 1 is a view of the edge region of a motor vehicle door or hatch in a section view.

Referring to the drawings, and in particular to FIG. 1, a part of the motor vehicle door or hatch 23 shown in FIG. 1 includes an outer sheet 1 with an edge strip 2 bent by approx. 90° from the sheet plane 24 toward an inside 11 of the vehicle and an inner sheet 3 with an edge strip 4 having a section extending substantially in parallel to edge strip 2. The two edge strips 2 and 4 are positioned adjacent each other to form a connection area 25 and are connected through a laser beam weld 5 filling the gap between these two edge strips 2 and 4. Besides, the outer sheet 1 and inner sheet 3 are supported on each other in a supporting range 6 extending next to the edge strips 3 and/or 4.

Edge strip 4 of inner sheet 3 is longer than edge strip 2 of outer sheet 1. The projecting section of edge strip 4 is bent from the plane 24 of the connection area back and into a direction orthogonally towards, or with respect to, the sheet metal plate plane and/or door plane 24. Thus it forms a holding bead 7 for a sealing 8. The sealing 8 over-grips and back-grips the holding bead 7 by a section 9. The sealing 8 is closely positioned at the outer side of edge strip 2, and includes a sealing lip 10 with an outside in flush alignment with the outside of the outer sheet 1. The sealing lip 10 seals a joint between motor vehicle door or hatch and a frame section 12.

FIG. 1 shows that the sealing 8 includes materials having different hardness in different sections. Section 9 of sealing 8 has a greater hardness, an adjacent section 13 resting against the outside of edge strip 2 has a medium hardness, and the sealing lip 10 has a smaller hardness.

Figure 2:
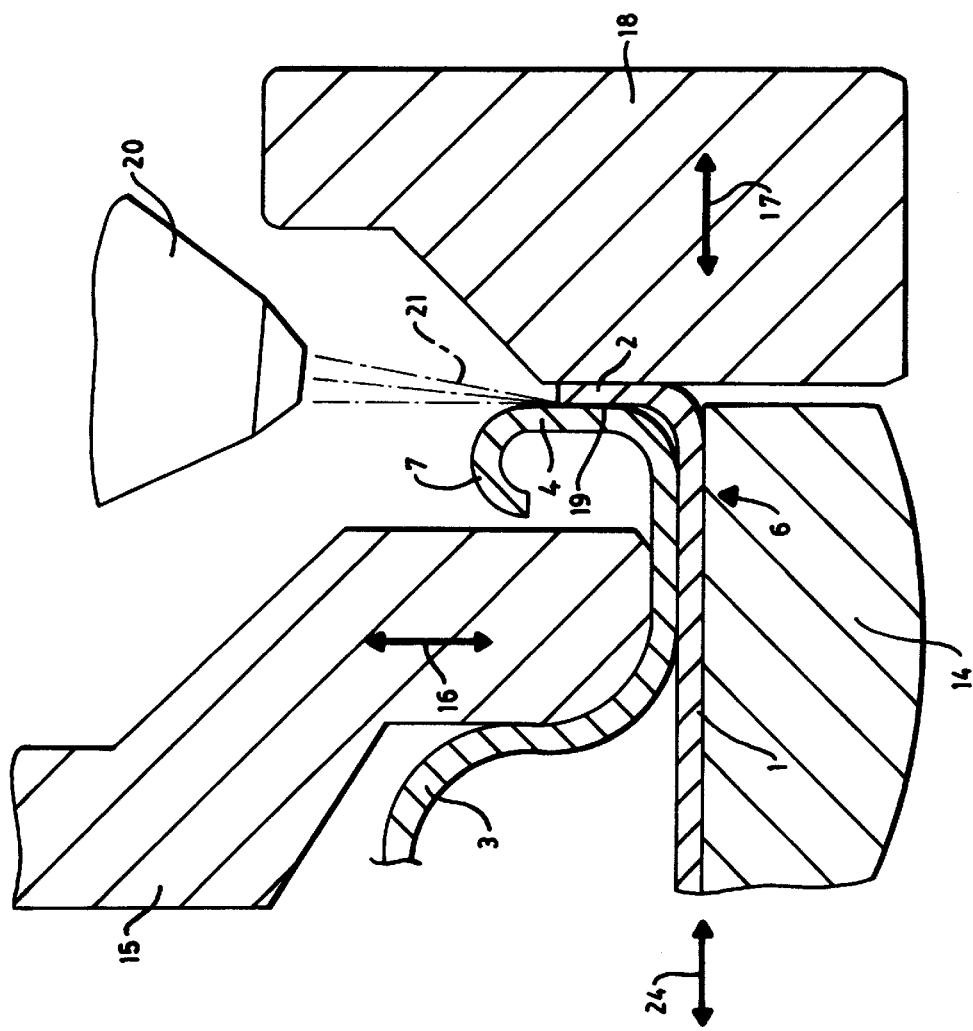
FIGS. 2, 3, and 4 are other variations or styles of the object as per FIG. 1.
Figure 3:
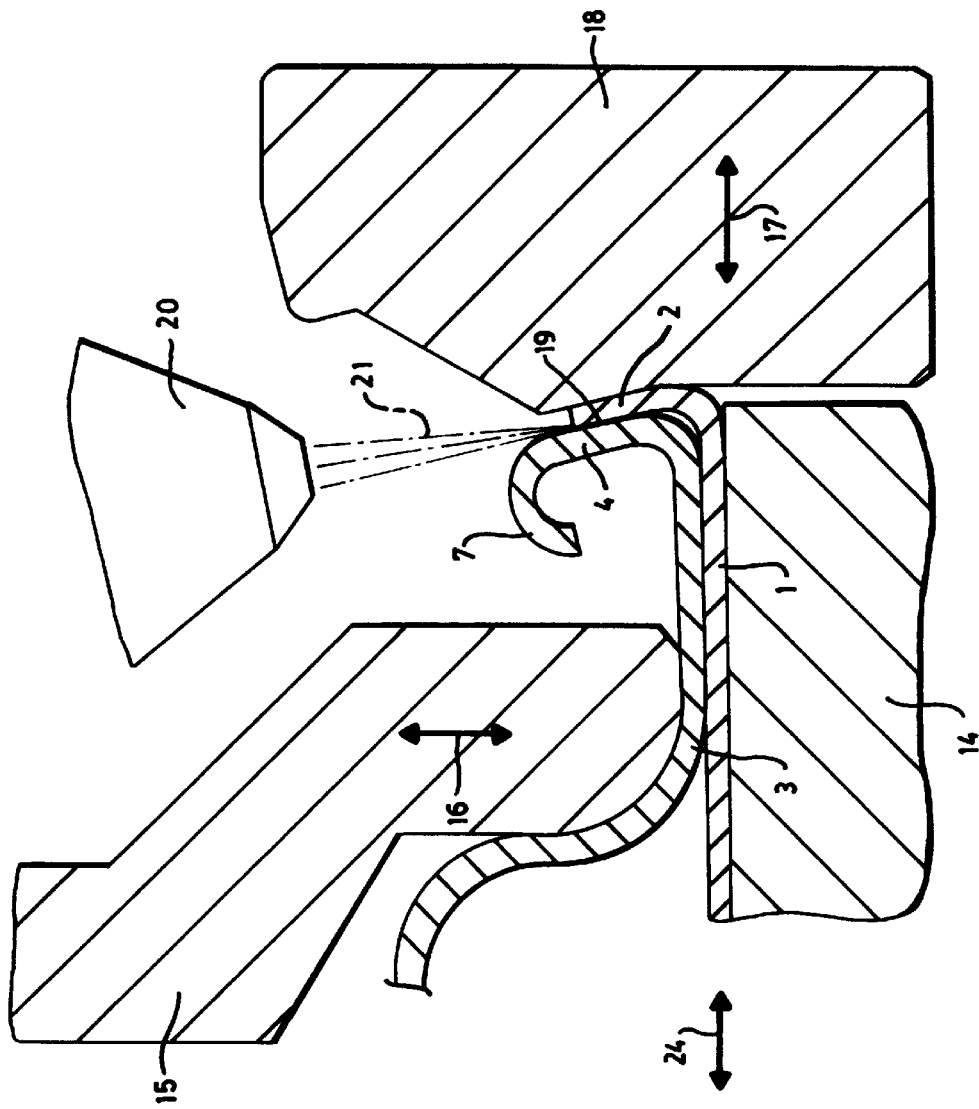
Figure 4:
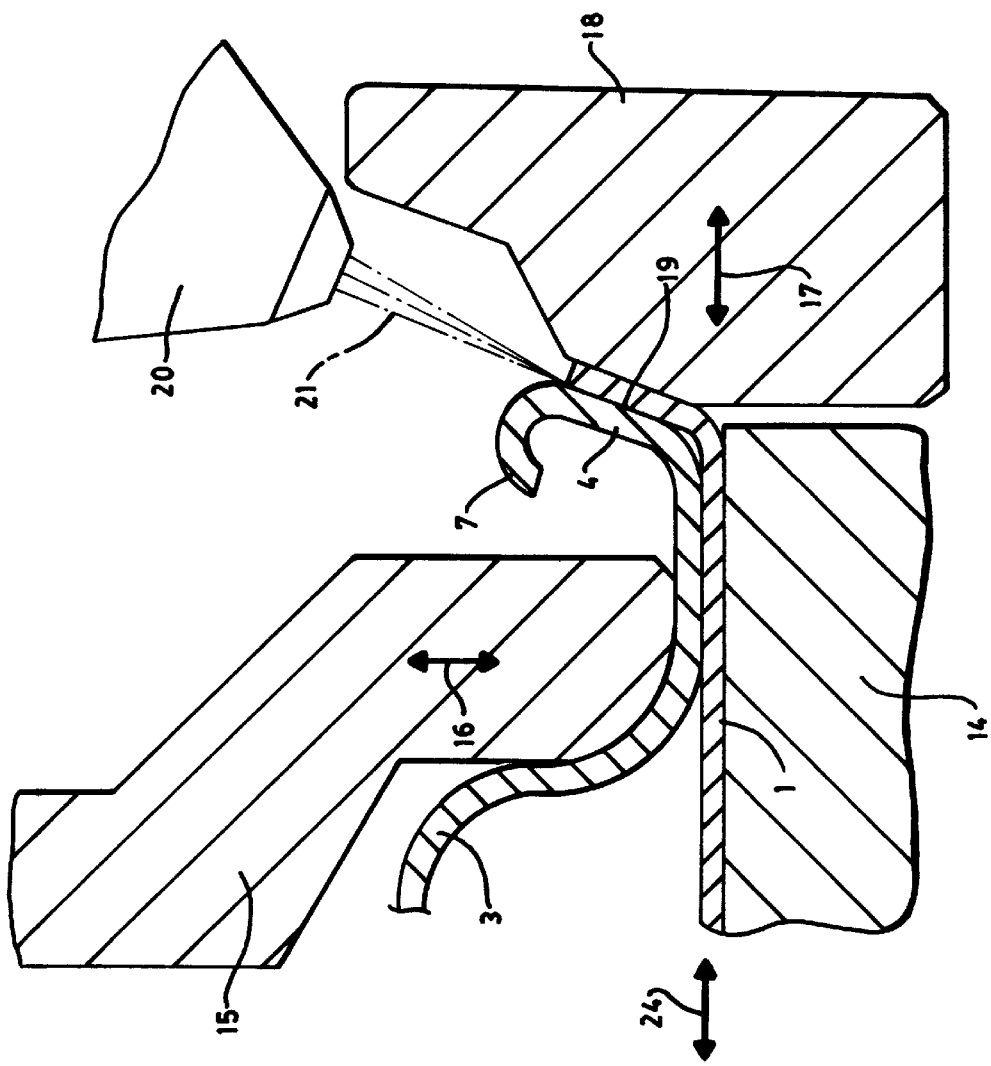
Figure 5:
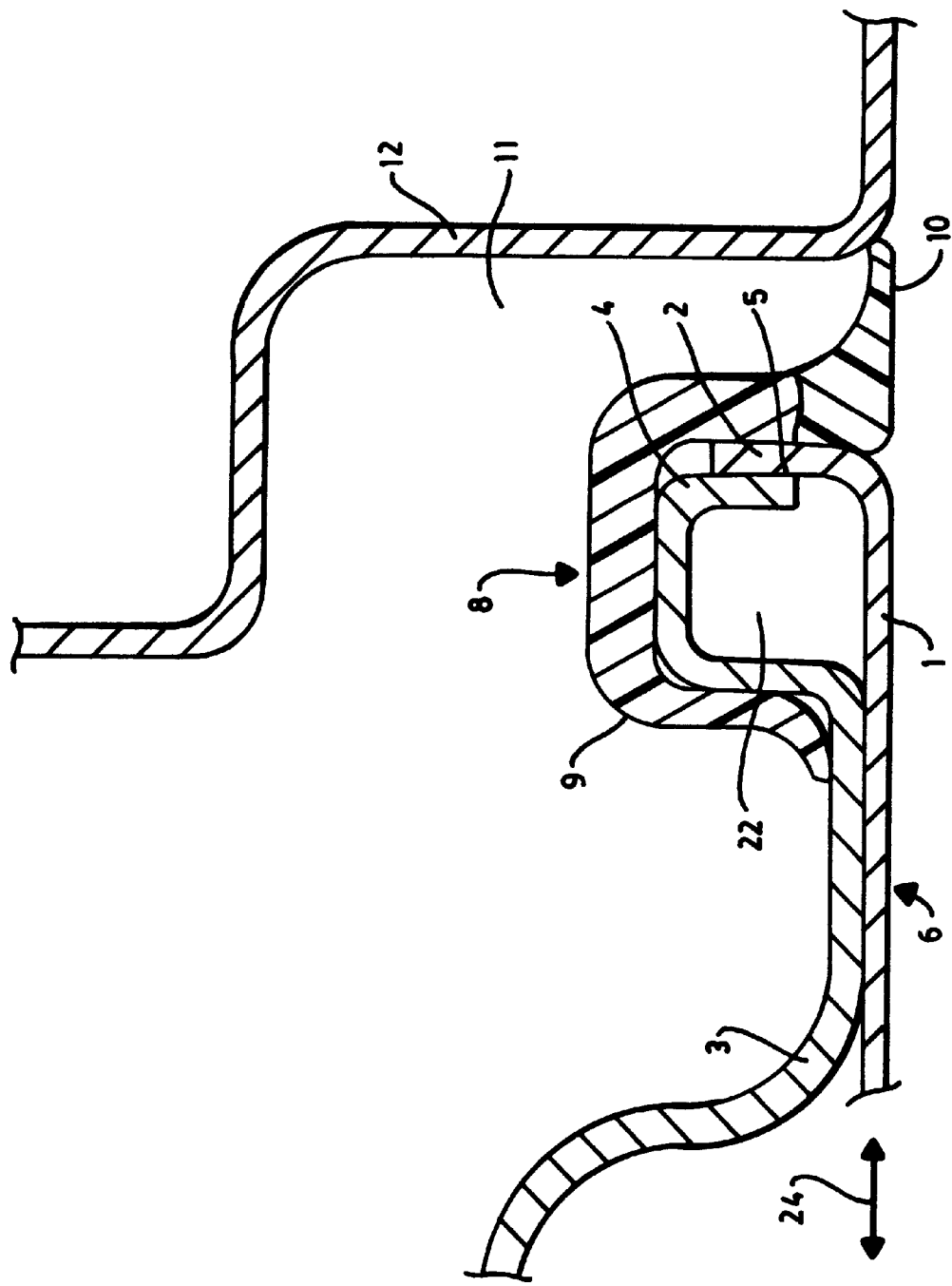
FIG. 5 is another embodiment of the edge region of a motor vehicle door or hatch in a sectional view.

FIGS. 2 to 4 use the same references to designate the same parts. In the method, as per FIG. 2, the edge strips 2 and/or 4 are bent off by approx. 90° from the sheet metal plane and/or door plane 24. In the method, as per FIG. 3, the edge strip 2 and/or 4 are bent off by an angle >90° from the sheet metal plane and/or door plane 24. In the method, as per FIG. 4, the edge strips 2 and/or 4 are bent off by an angle <90° from the sheet metal plate plane and/or door plane 24.

FIGS. 2 to 4 show a method for forming a connection of edge regions 2 and 4 of outer sheet 1 and inner sheet 3. Edge strip 2 and/or 4 are each bent off from the outer sheet 1 and inner sheet 3, and the sheets are laid on each other as well as being restrained in support area 6 between a support 14 and a hold-down device 15. A double arrow 16 elucidates that the hold-down device 15 can be moved orthogonally to the support 14. A clamping slide 18 is pushed in the direction of double arrow 17, which is in the sheet metal plate and/or door plane 24, to cause edge strip 2 of outer sheet 1 to be pressed against edge strip 4 of inner sheet 3. The resilience of edge strip 2 is expectable, reset and fixed to a design or predetermined level.

In this method, a gap 19 is open between a top of edge strips 2 and 4 so that the two edge strips 2 and 4 can be welded by a laser beam 21 emitted from a laser head 20. Laser beam 21 is directed into the gap 19 between the two edge strips 2 and 4 in such a manner that gap 19 is filled with the laser weld seam.

In FIGS. 5 to 8 the same references designate the same parts. In the method shown in FIG. 5, edge strip 4 of inner sheet 3 has a U-channel type shape forming a hollow profile 22 with an allocated section of outer sheet 1. The insides of edge strips 2 and 4 of outer sheet 1 and inner sheet 3 are connected to each other by the laser weld seam. Sealing 8 is also of a U-channel type shape and overgrips the hollow profile 22 at the inside of the door.

Figure 6:
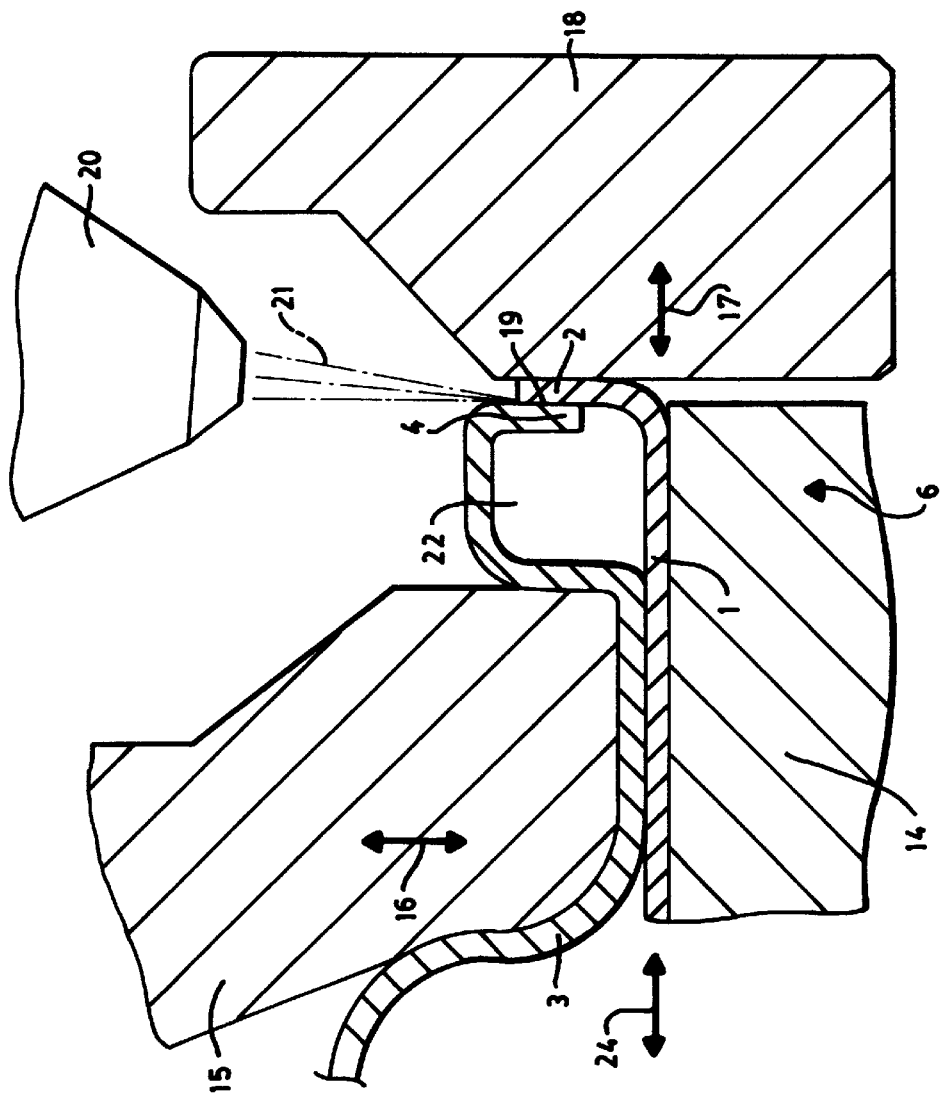
FIGS. 6, 7, and 8 are other variations or styles of the object as per FIG. 5.
Figure 7:
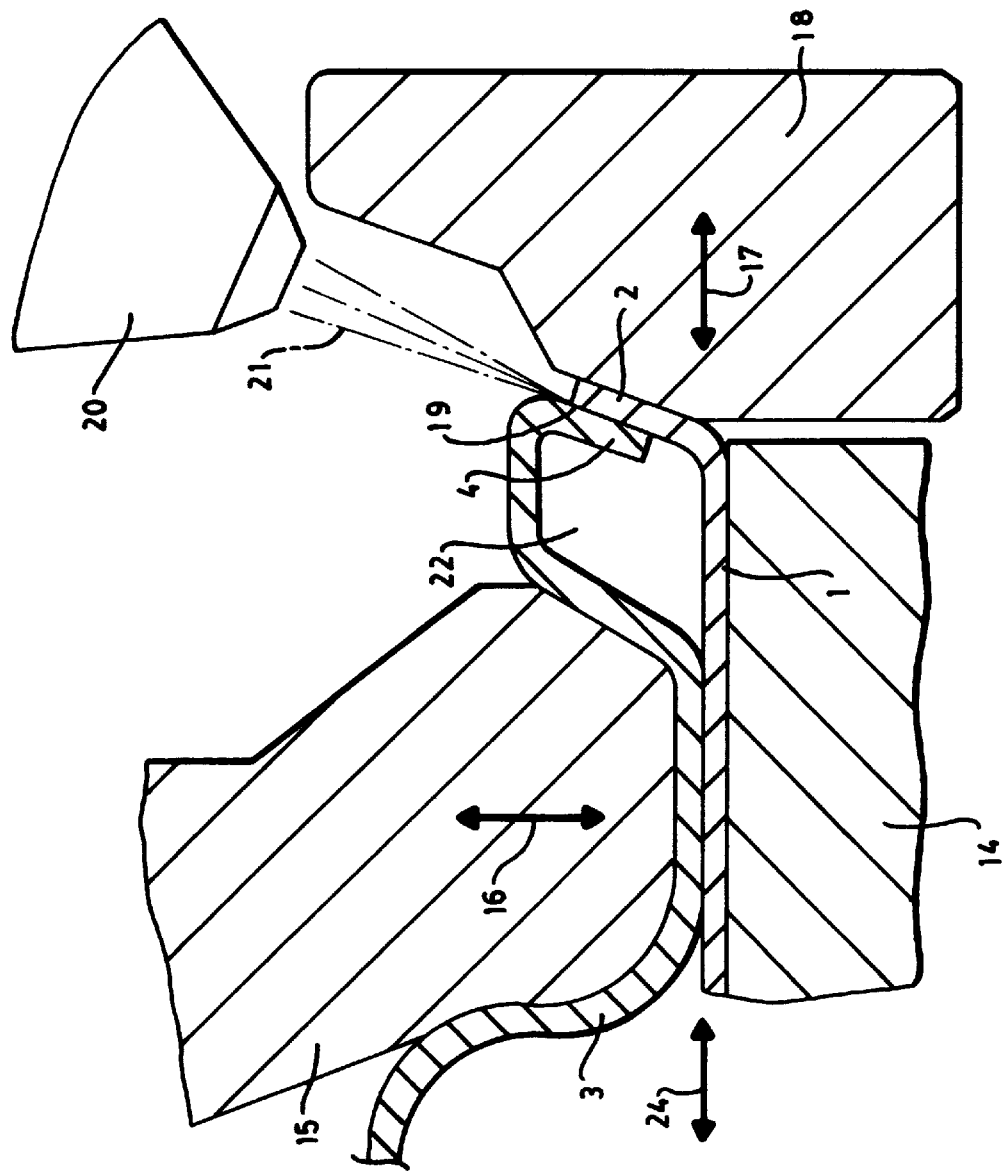
Figure 8:
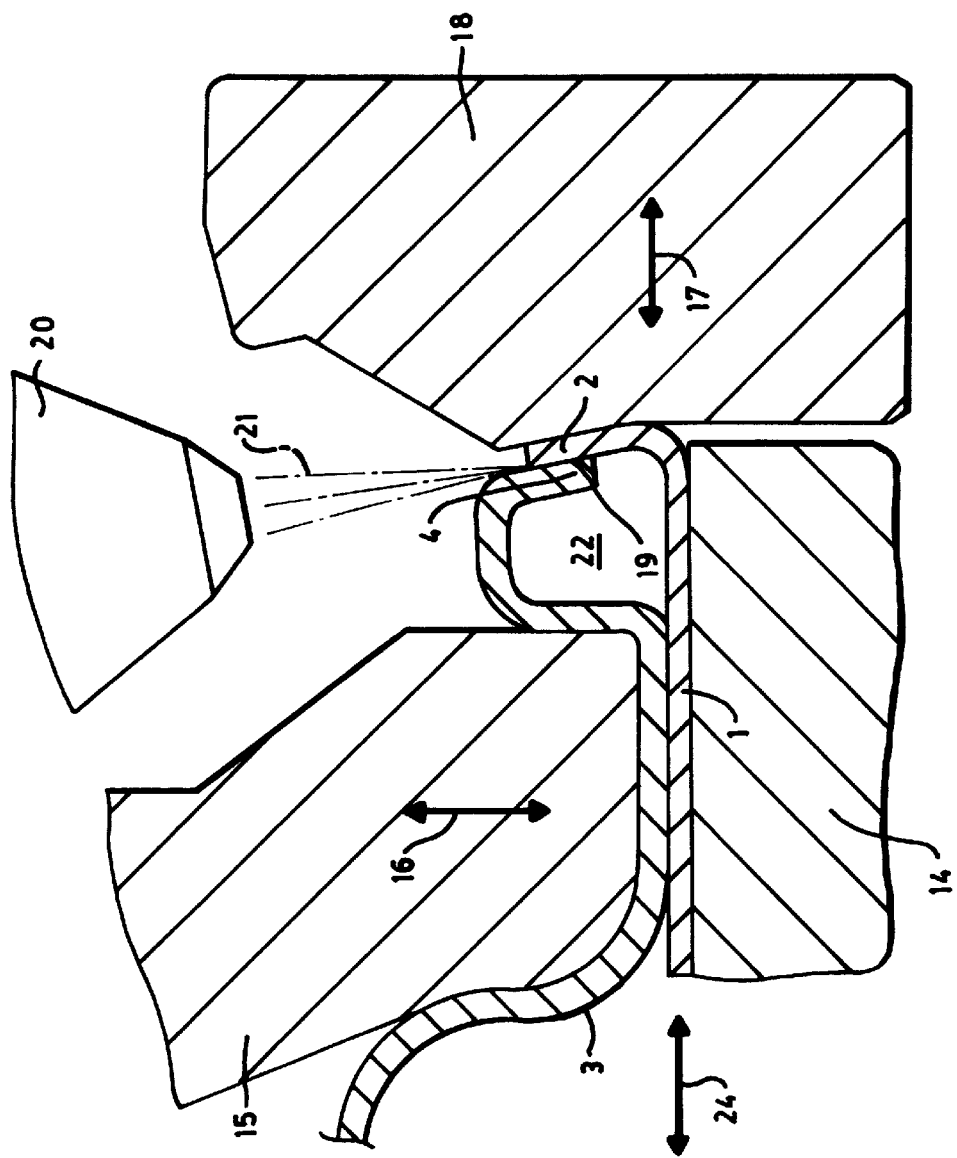

In the method shown in FIG. 6, edge strips 2 and/or 4 run at an angle of approx. 90° towards the sheet metal plate plane and/or door plane 24. In the method of FIG. 7, edge strips 2 and/or 4 run at an angle of <90° towards the sheet metal plate plane and/or door plane 24. In the method of FIG. 8, edge strips 2 and/or 4 run at an angle of >90° towards the sheet metal plane and/or door plane 24. FIGS. 6 to 8 show the connection between the two edge strips 2 and 4. The establishment is done in the same manner as explained by reference to FIGS. 2 to 4.

While specific embodiments of the invention have been shown and described in detail to illustrate the application of the principles of the invention, it will be understood that the invention may be embodied otherwise without departing from such principles.

| | List of References |
|---|---|
| 1 | Outer Sheet |
| 2 | Edge Strip of 1 |
| 3 | Inner Sheet |
| 4 | Edge Strip of 3 |
| 5 | Laser Weld Seam between 2 and 4 |
| 6 | Support Area between 3 and 4 |
| 7 | Holding beads at 4 8 Sealing |
| 9 | inner Section at 8 |
| 10 | Sealing Lip at 8 |
| 11 | Joint between Door Edge and 12 |
| 12 | Frame Section |
| 13 | Section with Medium Hardness of 8 |
| 14 | Support |
| 15 | Hold-Down Device |
| 16 | Double Arrow |
| 17 | Double Arrow |
| 18 | Clamping Slide |
| 19 | Gap between 2 and 4 |
| 20 | Laser Head |
| 21 | Laser Beam |
| 22 | Hollow Section |

What is claimed is:

1. An edge portion of a vehicle, the edge portion comprising:

an outer sheet including an edge strip angularly spaced from a remainder of said outer sheet toward an inside of the vehicle;

an inner sheet including an edge strip angularly spaced from a remainder of said inner sheet toward the inside of the vehicle, said edge strip of said outer sheet and said edge strip of said inner sheet being positioned to define a gap;

a weld seam filling said gap and connecting said edge strips of said outer and inner sheets.

2. The edge portion of the vehicle in accordance with claim 1, wherein:

said outer sheet is an outer sheet of one of a door and a hatch of the vehicle, said inner sheet is an inner sheet of one of a door and a hatch of the vehicle;

said edge strip of said inner sheet forms a bead;

said weld seam is a laser weld seam.

3. The edge portion of the vehicle in accordance with claim 1, wherein:

said edge strips of said inner and outer sheets are angularly spaced from said remainder of said outer sheet by an angle less than or equal to 90 degrees.

4. The edge portion of the vehicle in accordance with claim 1, wherein:

said remainder of said outer sheet forms a door plane;

said edge strips of said inner and outer sheets are angularly spaced from said door plane by an angle less than or equal to 90 degrees.

5. The edge portion of the vehicle in accordance with claim 1, wherein:

said edge strips of said inner and outer sheets are angularly spaced from said remainder of said outer sheet by an angle greater than or equal to 90 degrees.

6. The edge portion of the vehicle in accordance with claim 1, wherein:

said remainder of said outer sheet forms a door plane;

said edge strips of said inner and outer sheets are angularly spaced from said door plane by an angle greater than or equal to 90 degrees.

7. The edge portion of the vehicle in accordance with claim 1, wherein:

a connection area is positioned where said edge strips of said inner and outer sheets are connected;

said edge strip of said inner strip forms a holding bead extending from said connection area;

a sealing bead is connected to said holding bead.

8. The edge portion of the vehicle in accordance with claim 7, wherein:

said holding bead extends from said connection area to a direction substantially orthogonal to said remainder of said outer sheet.

9. The edge portion of the vehicle in accordance with claim 1, wherein:

said edge strip of said inner sheet has a U-shaped channel forming a hollow profile with a section of said outer sheet.

10. The edge portion of the vehicle in accordance with claim 9, further comprising a sealing connected to said edge strip of said inner sheet.

11. The edge portion of the vehicle in accordance with claim 9, wherein:

said inner and outer sheets have inner sides facing the inside of the vehicle, said inner side of said inner and outer sheets being connected together.

12. The edge portion of the vehicle in accordance with claim 11, wherein:

said weld seam connects said inner sides of said inner and outer sheets.

13. A method for forming a connection between inner and outer sheets of an edge portion of a vehicle, the method comprising the steps of:

providing each of the inner sheet and outer sheet with a edge strip;

bending each of said edge strips to a position angularly spaced from a remainder of respective said inner and outer sheets in a direction toward an inside of the vehicle;

arranging said inner sheet on said outer sheet;

clamping said inner sheet and said outer sheet between a support and a hold-down device;

pressing one side of said edge strip of said outer sheet against said edge strip of said inner sheet;

directing a laser beam into a gap between said edge strips of said inner and outer sheets;

welding said edges strips together with said laser beam.

14. The method in accordance with claim 13, wherein:

said outer sheet is an outer sheet of one of a door and a hatch of the vehicle, said inner sheet is an inner sheet of one of a door and a hatch of the vehicle;

said edge strip of said inner strip is formed into a bead.

15. The method in accordance with claim 13, wherein:

said edge strips of said inner and outer sheets are angularly spaced from said remainder of said outer sheet by an angle less than or equal to 90 degrees.

16. The method in accordance with claim 13, wherein:

said remainder of said outer sheet forms a door plane;

said edge strips of said inner and outer sheets are angularly spaced from said door plane by an angle less than or equal to 90 degrees.

17. The method in accordance with claim 13, wherein:

said edge strips of said inner and outer sheets are angularly spaced from said remainder of said outer sheet by an angle greater than or equal to 90 degrees.

18. The method in accordance with claim 13, wherein:

said remainder of said outer sheet forms a door plane;

said edge strips of said inner and outer sheets are angularly spaced from said door plane by an angle greater than or equal to 90 degrees.

19. The method in accordance with claim 13, wherein:

a connection area is positioned where said edge strips of said inner and outer sheets are connected;

said edge strip of said inner sheet is bent to form a holding bead extending from said connection area;

a sealing bead is connected to said holding bead.

20. The method in accordance with claim 19, wherein:

said holding bead extends from said connection area to a direction substantially orthogonal to said remainder of said outer sheet.

* * * * *